United States Patent [19]

Koch

[11] 4,314,746
[45] Feb. 9, 1982

[54] REAR WALL CONSTRUCTION OF A PHOTOGRAPHIC CASSETTE CAMERA

[76] Inventor: Carl Koch, Im Santenbuhl, CH-8211 Stetten, Switzerland

[21] Appl. No.: 237,953

[22] Filed: Feb. 25, 1981

[30] Foreign Application Priority Data

Jul. 11, 1980 [DE] Fed. Rep. of Germany ....... 3026306

[51] Int. Cl.³ .................... G03B 7/08; G03B 17/26; G03B 17/02
[52] U.S. Cl. ............................. 354/23 R; 354/276; 354/288
[58] Field of Search ............... 250/239; 354/275, 276, 354/288, 22, 23 D, 23 R, 24

[56] References Cited

U.S. PATENT DOCUMENTS

| 741,668 | 10/1903 | Hutchings | 354/288 |
| 3,100,429 | 8/1963 | Koch | 354/23 R |
| 3,471,704 | 10/1969 | Koch | 250/239 |

FOREIGN PATENT DOCUMENTS

| 1216679 | 5/1966 | Fed. Rep. of Germany | 354/23 R |
| 746837 | 3/1956 | United Kingdom | 354/23 R |

*Primary Examiner*—Donald A. Griffin
*Attorney, Agent, or Firm*—Watson, Cole, Grindle & Watson

[57] ABSTRACT

In a photographic cassette camera having a cassette guide frame and an attachable ground-glass frame supporting a ground-glass for observation of a subject to be photographed, one of the grames defining an image field of the camera, a rear wall construction of the camera wherein the cassette guide frame has a support frame surrounded by lateral guide surfaces, the ground-glass frame having support runners which fit against the support frame in the guide surfaces for mounting the ground-glass parallel to the support frame, a bar-shaped exposure measuring probe having at one end an optoelectric transducer and being mounted on a holding device on one of the frames for sliding and pivotal movement adjacent one of the lateral support elements of the cassette guide frame, such one element and one of the adjacent support runners having recesses therein permitting movement of the probe between a selectively adjustable measuring position within the field on a front side of the ground-glass and a rest position completely out of the image field, the probe having a dimension perpendicular to the support plane which exceeds the ground-glass focal distance, and the probe engaging the recesses whenever it is adjusted for a measuring position.

10 Claims, 8 Drawing Figures

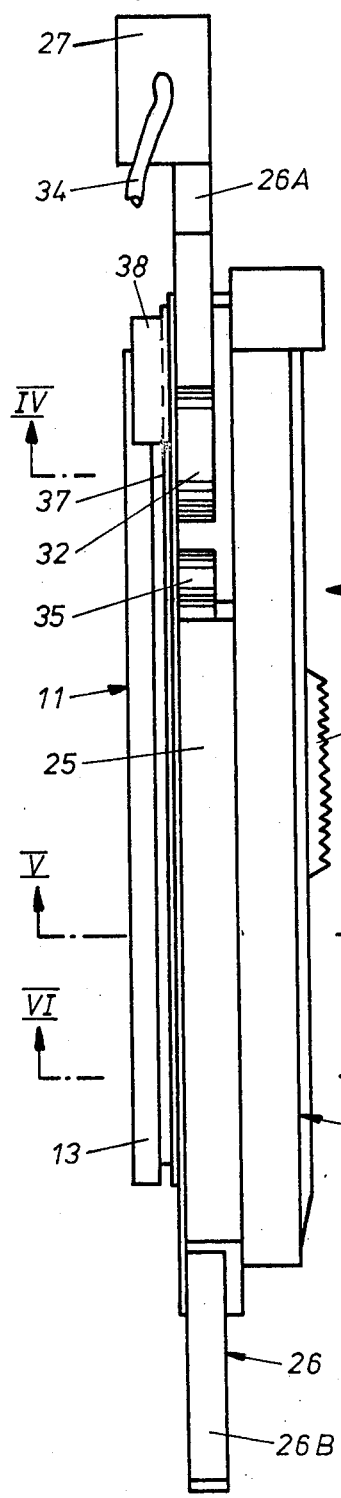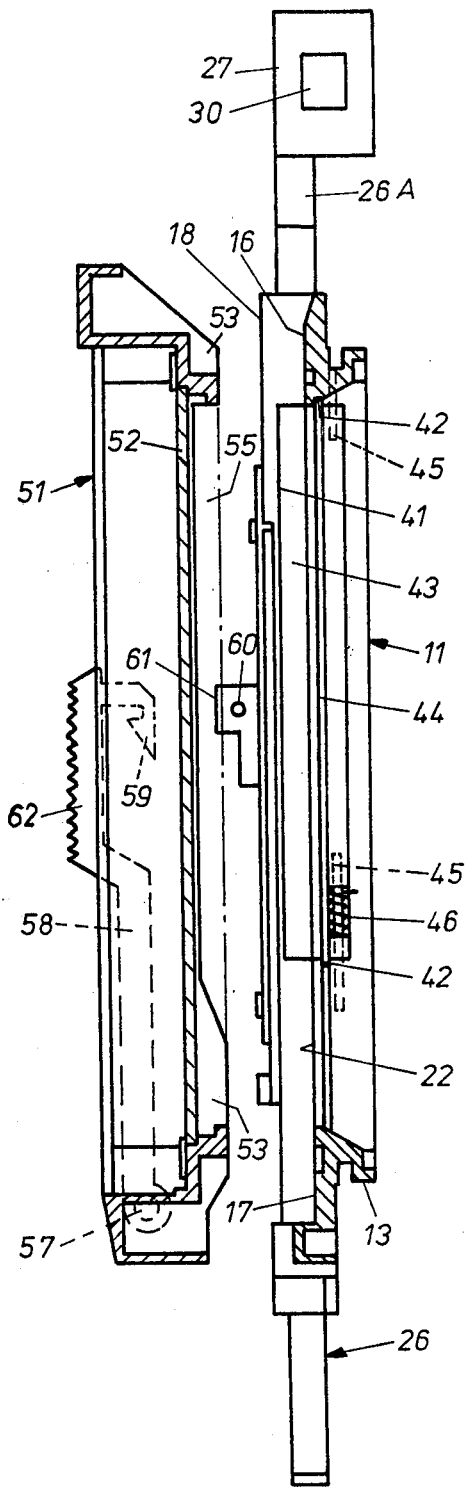

REAR WALL CONSTRUCTION OF A PHOTOGRAPHIC CASSETTE CAMERA

BACKGROUND OF THE INVENTION

This invention relates generally to a photographic cassette camera, and more particularly to a rear wall construction for such camera.

Cameras of the class described generally have a cassette guide frame and a ground-glass frame for observation of an image, one of the frames defining an image field of the camera. The cassette type frame has planar support elements defining a support plane surrounded by lateral support elements defining lateral guide surfaces, the ground-glass frame having support runners which fit against these support elements of the cassette-type frame for mounting the ground-glass parallel to support frame at a predetermined focal distance. A rod-shaped exposure test probe, having at one end an opto-electric transducer, is mounted on a holding device on one of the frames for both sliding and pivotal movement adjacent one of the lateral support elements. Such one support element and one of the support runners lying adjacent thereto have recess therein permitting movement of the probe between a selectively adjustable measuring position within the field of a front side of the ground-glass and a rest position completely out of the image field. A photographic cassette camera having a rear wall construction of this general type is disclosed in German Pat. No. 1,216,679, and an embodiment of the aforedescribed rod-shaped exposure probe is disclosed in German Pat. No. 1,572,704.

For carrying out precise selective brightness measurements of the different photo parts within the image field, the opto-electric transducer of the light meter probe should preferably be disposed on the front side of the ground glass facing the lens of the camera, but spaced a slight distance away, while the ground glass lies as precisely as possible in the image plane of the camera.

In practice, however, it has turned out that adhering to these conditions causes difficulties in construction, whenever the camera is to be suitable for use of the so-called "international" cassettes (according to standatd sheet ASA Z38.1.5.-9151) generally customary today.

For picture sizes up to 4×5″ (9×12 cm), cassettes of the type mentioned have a standard depth T=5.0±0.18 mm from the support plane of the cassette to the contact plane for the reverse side of the photographic material. However, the light sensitive layer of the photographic material is on the side of the film lying away from the contact plane and therefore lies on the average, only 4.75 to 4.95 mm behind the support plane of the cassette. This distance is known as the "film focal distance." Correspondingly, the frosted front side of the ground glass is to be reset by 4.85 mm as compared to the support planes of the support runners of the ground glass frame (ground glass focal distance).

In order to be able to introduce the rod-shaped exposure test probe between the support frame of the cassette and the ground glass into a measuring position and at the same time avoid contact of the ground front side of the ground glass, which is sensitive to scratches by the probe, the probe should be at the most 4.5 mm thick, measured perpendicularly to the support plane. This is most difficult to achieve in practice because of the requirements for strength of the probe, since the probe must be at least 20 cm long and hollow for the reception of the opto-electric transducer, electric connecting lines and perhaps a mechanical linkage for shifting the transducer. In practice, the probe is at least 7 mm thick. Thus, the designer is forced to shift the ground glass farther back during the selective brightness measurements in order to provide sufficient space for the exposure test probe between the cassette-type of supporting plane and the ground glass, in order to place the exposure test probe into a measuring position on the front side of the cassette guide grame facing the lens of the camera objective. Each of the aforedescribed measurements is disadvantageous because, firstly, the ground glass is no longer in the image plane of the camera during the brightness measurements and thus the picture on the ground glass becomes blurred. Secondly, the brightness measurement may not take place directly near the image plane, and moreover, the wide-angle usefulness of the camera is impaired.

SUMMARY OF THE INVENTION

It is, therefore, an object of the present invention to provide a rear wall construction of a photographic cassette camera in such a manner as to eliminate the aforedescribed design difficulties, and to permit use of the standardized international cassettes as well as selective brightness measurements directly in front of the ground front of the ground-glass lying in the image plane of the camera.

In accordance with the invention, it is possible to select the thickness of the rod-shaped exposure test probe, measured along a direction vertically and perpendicularly to the cassette support frame, greater than the ground glass focal distance, i.e., the distance between the support plane and the ground glass with the support runners of the ground-glass frame fitted against the support elements of the cassette guide frame. Thus, the probe set in one of the measuring positions when in engagement with the lateral elements and support runner recesses, is given sufficient space for penetration of the probe to the image field. The probe thickness may thus, for example, be about 7 mm, while the ground glass support measurement is only 4.85 mm. Thus, the ground glass may remain in the same location, not only for the critical focusing of the ground glass picture in view of the photograph to be taken, but also during the succeeding selective measurements. For this reason, the image quality is preserved unchanged for the selection of the measuring positions and for the brightness measurements. In the measuring position of the exposure test probe, the opto-electric transducer is located directly adjacent the front of the ground glass, facing the camera lens, as a result of which a precise setting of the opto-electric transducer into the selected measuring positions as well as correct brightness measurements, are made possible. Furthermore, the probe set in one of the measuring positions requires no space lying between the cassette guide frame and the camera lens, thereby rendering the camera unrestrictedly suitable for the use of wide-angle lenses with extremely short focal lengths.

In order to prevent, particularly when photographing in bright sunlight or in the light of a searchlight, any undesirable incidence of ambient light occurring through the aforementioned recess/es in communication with the light sensitive material, at least one movable segment is disposed on the cassette guide frame for the light sensitive closure of such recesses. Such a moveable segment may be pivotally mounted on the cassette guide frame and is spring-biased into a light-proof closing position, such segment being pivoted into an open position by the probe and being moved from its rest position to one of its measuring positions, the moveable segment being pivotable into its open position by the probe itself against the influence of the spring. Whenever the moveable segment is in a closed position, no undesireable light may enter through the recesses into the front side facing the camera lens for exposure of a cassette inserted into the cassette guide frame, not even if the exposure test probe is completely pulled out of its holding device or has been moved from the rear wall of the camera together with the holding device.

Other objects, advantages and novel features of the invention will become more apparent from the following detailed description of the invention when taken into conjunction with the accompanying drawings.

BRIEF DESCRIPTION OF THE DRAWINGS

FIG. 1 is an elevational side view of the camera rear wall according to the invention, with the exposure test probe shown in its rest position;

FIG. 3 is a vertical sectional view taken substantially along line III—III of FIG. 2, the ground glass frame being shown removed from the cassette guide frame for the purpose of clarity;

DETAILED DESCRIPTION OF THE INVENTION

Figure 2:
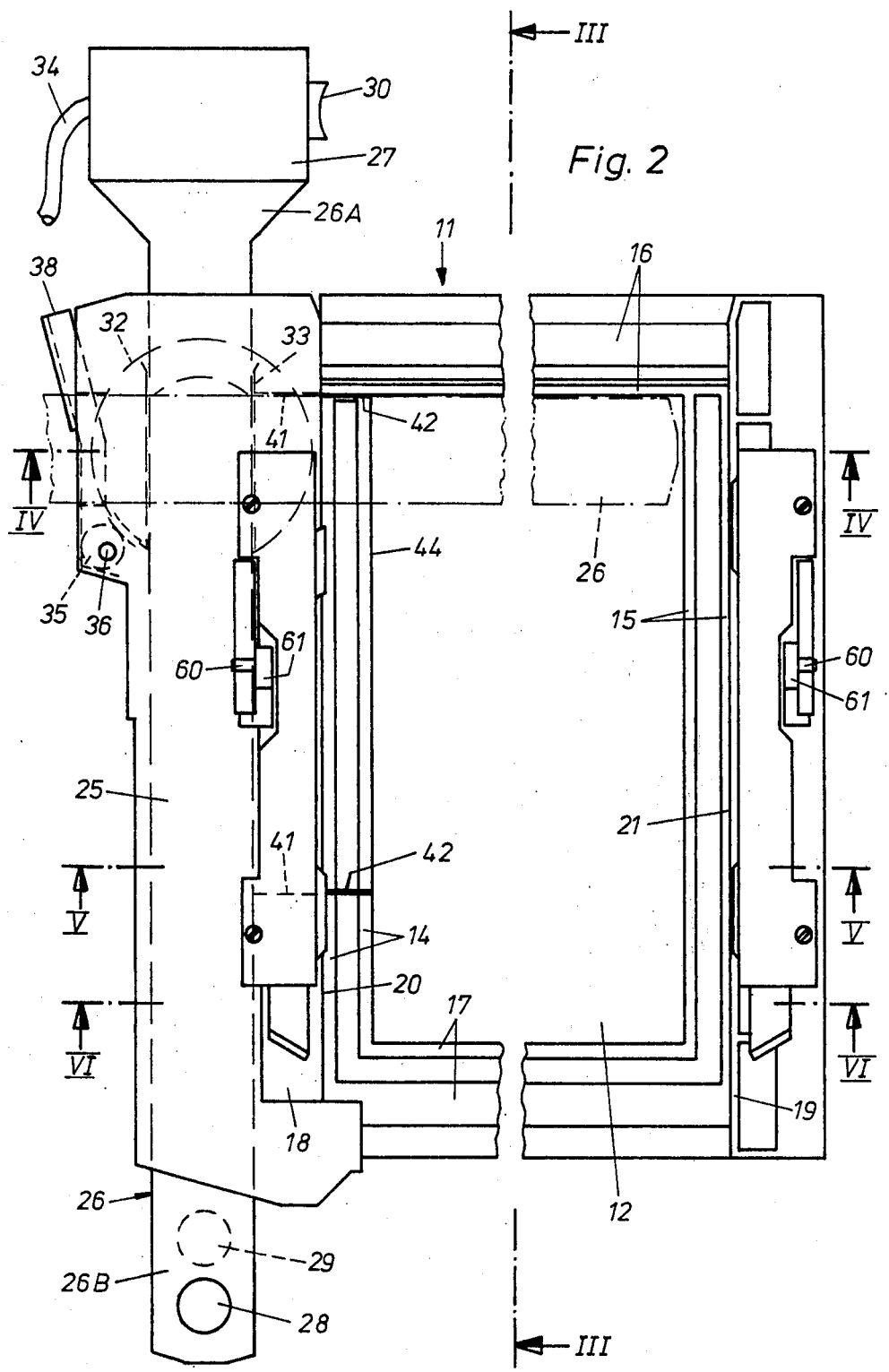
FIG. 2 is a plan view taken in the direction of arrow II of FIG. 1, with the ground glass frame removed.

Turning now to the drawings wherein like reference characters refer to like and corresponding part throughout the several views, the back wall of the camera (not otherwise shown) illustrated in the drawings has a cassette guide frame 11 which, as shown in FIG. 2, defines an image field 12, the guide frame having a flange-like peripheral edge 13 (FIGS. 1, 3, 4, 5, and 6) which in a known manner is intended to be connected with the end of a light-tight bellows, facing away from the camera lens, directly or by means of an interposed coupling frame. Furthermore, cassette guide frame 11 has support shoulders or elements 14,15,16 and 17 disposed along the periphery of the image field which define a support plane 22 for a cassette (not shown) loaded with light-sensitive photographic material. Furthermore, two lateral guide jaws or support elements 18 and 19 (FIGS. 2 and 6, as well as partly FIGS. 4 and 5) are provided on the cassette guide frame, the lateral supports defining parallel guide planes 20 and 21 facing each other for the lateral guidance of the cassette. These guide planes extend at right angles to support plane 22. On the left side of the cassette guide frame in FIG. 2, facing the observer in FIG. 1, a scabbard-like housing 22 is disposed for the reception of a rodlike exposure test probe 26 shown in a rest position. Details of such probe are set forth, for example, in the aforementioned German Pat. No. 1,572,704 and are therefore presumed to be known. Nevertheless, for a better understanding it is to be pointed out that the probe has a handle 27 on one end 26A for adjustment thereof, and the other end 26B of the probe has a window-like breakthrough 28 for sighting an image portion the brightness of which is to be measured. Inside the hollow probe and adjacent breakthrough 28 is disposed an opto-electric transducer 29 which may be moved to the location of breakthrough 28 by operation of a key 30 disposed on handle 27, and which may be returned to its protected position in the hollow probe under the influence of a spring (not shown) upon release of key 30. An electric cable 34 emerges from handle 27 and interconnects opto-electric transducer 29 with an electric or electronic device (not shown) for calculating and/or controlling the exposure parameters.

Within housing 25 there is a holding device 32 for the retention of probe 26. This holding device essentially comprises a rotatably mounted disk with a diametrically continuous channel 33, in which probe 26 is guided for longitudinal shifting movement. A blocking device 35–38 is associated with holding device 32, and includes a cam 35 fixed on a shaft 36 rotatably mounted in housing 25, the cam being provided for cooperation with a peripheral portion of holding device 32. Outside housing 25, shaft 36 carries an operating lever 37 having a handle 38 for pivoting the cam into a position for exerting pressure on holding device 32 for locking the same against rotation and at the same time for clamping down the exposure test probe in channel 33 to secure it against longitudinal shifting.

As shown in FIGS. 2 and 3, guide support 18 of the cassette guide frame, adjacent holding device 32 for the exposure test probe, has an elongated recess 41. And, a similar elongated recess 42 extends from recess 41 through the adjacent support shoulder 14. Recesses 41 and 42 are so dimensioned as to permit passage of end 26B of the probe into the image field from its position shown in solid outline in FIG. 2 to its position shown in phantom outline therein, or into one of several intermediate slanting positions, so that breakthrough 28 or opto-electric transducer 29 may be set practically into any arbitrary measuring position of the image field. To effect movement, handle 27 of the probe is grasped for upwardly shifting the probe until the terminal end of the probe lies adjacent recesses 41 and 42. The probe may then be easily swivelled into the image field.

Recess 41 and its continuation recess 42 may be closed light-tight by legs 43,44 of an angle section whenever the closure test probe is not adjusted to one of its measuring positions. This angle section is pivotally mounted on cassette frame 11 by means of axle pins 45 (FIGS. 3, 4, 5, 7 and 8). The common axis of the pins extend along the outer side of leg 44 parallel to support plane 22 and parallel to lateral guide plane 20. The angle section is movable between its closing position of FIGS. 4 and 7 and its open position of FIGS. 5 and 8 (90° apart). One of pins 45 is surrounded by a coil spring 46, shown in FIGS. 7 and 8. This spring has two tangentially projecting end portions, one of which is supported by the angle section, and the other by an immovable portion of the cassette guide frame. Spring 46 resiliently urges the angle section into its closing position of FIGS. 4 and 7 such that recess 41 in guide support 18 is closed by leg 43, and continuation recess 42 extending through support shoulder 14 is closed by leg 44 of the angle section. In this closing position, inner side 43A of leg 43 lies in the plane of lateral guide plane 20 so that this lateral guide plane is continuous at this location recess 41, while side 44A of leg 44, facing away from the camera lens, lies in support plane 22 so as to continuously bridge the plane at this location.

Figure 8:
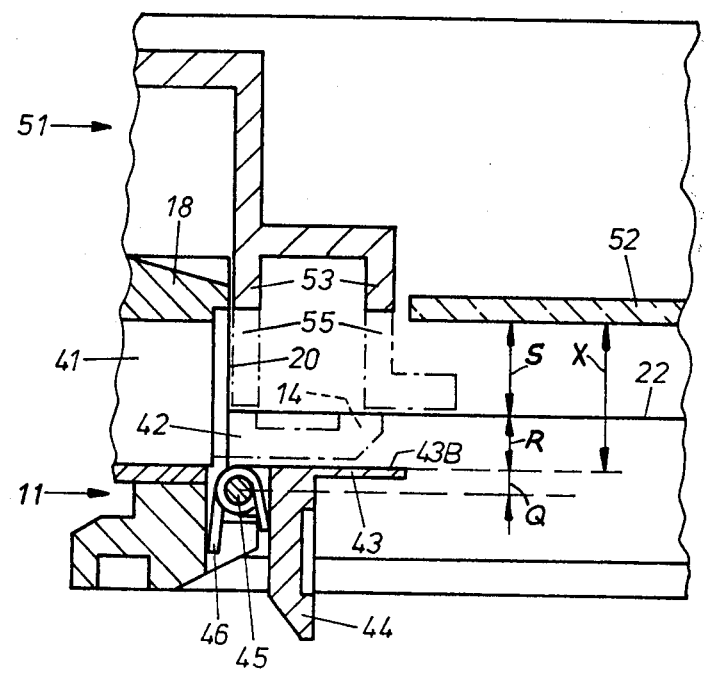

The common axis of pins 45 is displaced by a distance P (FIG. 7) relative to support plane 22 in a direction in front of the cassette guide frame to be turned toward the camera lens, this distance being considerably greater than distance Q that the axis of pins 45 is spaced from outer wall 43B of leg 43 when moved to its open position of FIG. 8. In this position, side 43B lies parallel to support plane 22 at a distance R therefrom, so that $R = P - Q$. The significance of this distance R will be explained in more detail hereinafter. It can be seen that when angle section 43,44 is moved from its closing position into its open position, leg 43 is moved through continuation 42 of recess 41, so that the width of recess 42 must be slightly larger in a direction parallel to the axis of the pins that the dimension of leg 43 measured in the same direction.

Figure 4:
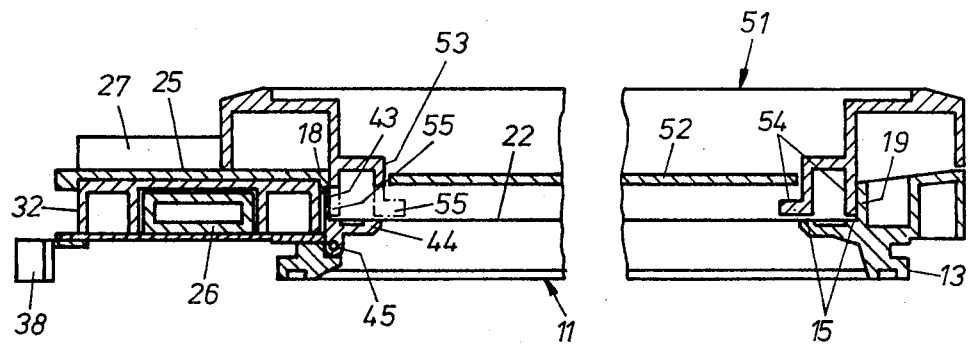
FIGS. 4, 5 and 6 are horizontal sectional views respectively taken substantially along lines IV—IV, V—V, VI—VI of FIGS. 1 and 2; and, FIGS. 7 and 8 are partial sectional views similar to FIG. 5, but at an enlarged scale, showing the pivotable segments of the cassette guide frame respectively in closing and opening positions.
Figure 5:
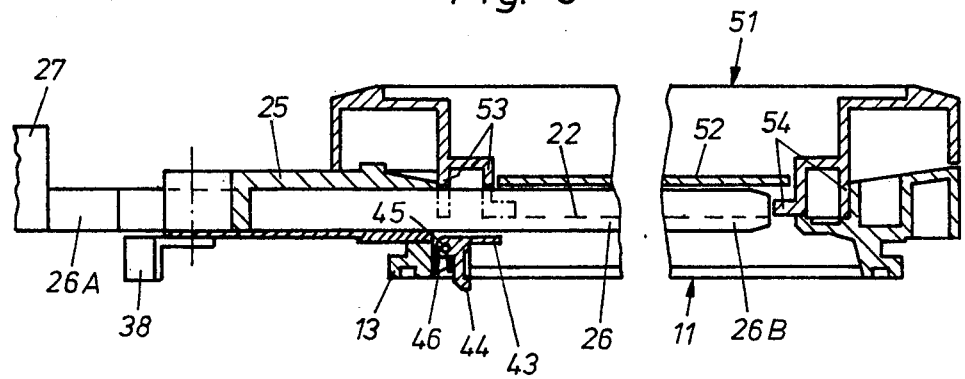
Figure 6:
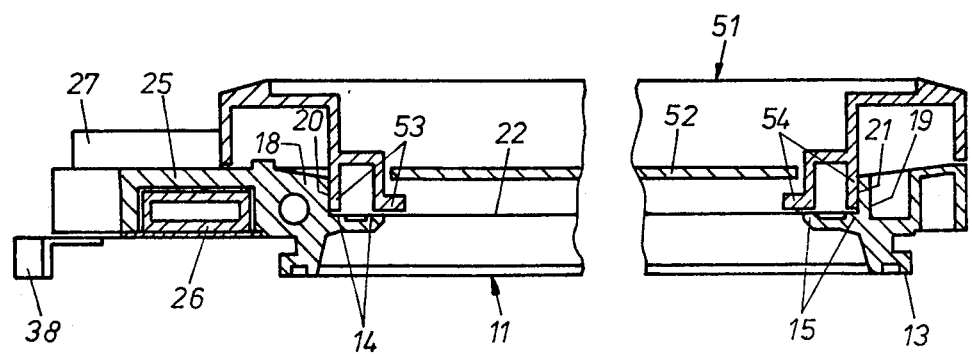
Figure 7:
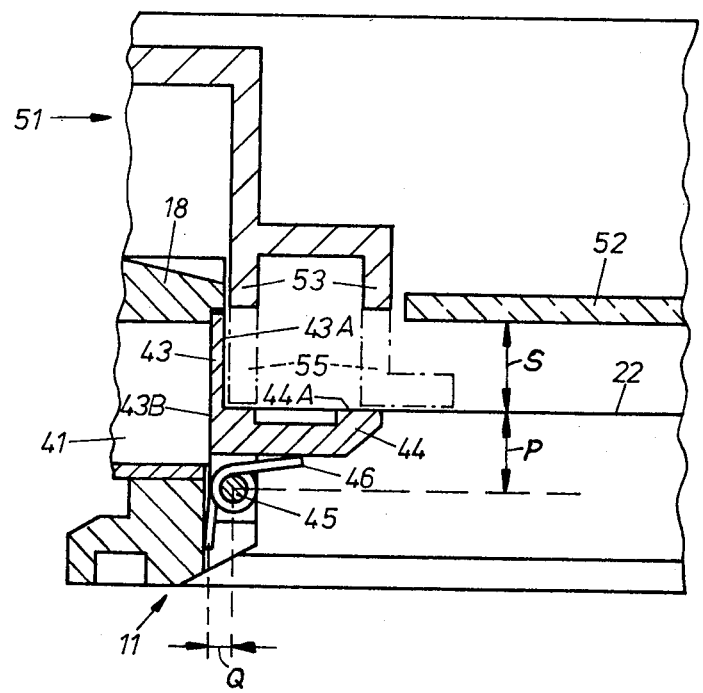

As shown in FIGS. 1, 3, 4, 5 and 6, the rear wall of the camera furthermore has a ground glass frame 51 in which a ground glass 52 is secured. The ground glass frame has two laterally disposed pairs of support runners 53,54 which lie against corresponding support shoulders 14 and 15 of the cassette guide frame, as shown in FIG. 6, when no cassette is inserted. The two support runners 53, adjacent holding device 32, each have a recess 55 for the passage of probe 26 to the image field, as seen in FIGS. 3, 4 and 5 as well as in FIGS. 7 and 8. In the longitudinal direction of each support runner 53, its recess 55 is dimensioned such that leg 43 of the angle section may pass through recesses 55 unimpeded upon pivotal movement of the angle section, and so that the adjustment of the probe into the various measuring positions within the image field is not impeded by the runners 53. The ground front of the ground glass 52 to be made facing the lens of the camera, is re-displaced by the so-called ground glass focal distance in relation to the supporting surfaces of runners 53 and 54, which are intended for fitting against shoulders 14 and 15. This ground glass focal distance is designated S in FIGS. 7 and 8 and amounts to, for example, 4.85 mm as noted earlier.

For interconnecting ground glass frame 51 with cassette guide frame 11, the ground glass frame is provided with a pair of connecting arms 58 pivotally mounted on an axle 57, only one of which arms is shown in FIG. 3. Each connecting arm has a coupling hook 59 for engagement with a coupling pin 60 provided on an extension of frame 11, as shown in FIGS. 2 and 3. Springs (not shown) are associated with the connecting arms for resiliently urging them in a clockwise direction, when viewing FIG. 3. Each arm has a finger grip portion 62, projecting through a corresponding opening on the reverse side of frame 51, to facilitate inward pivotal movement of each arm against the action of its spring, so that hook 59 may be disengaged from coupling pin 60 to facilitate removal of frame 51 from frame 11.

Whenever the coupling hooks are hooked into pins 60, the ground glass frame is forced into the direction toward the cassette guide frame under the action of connecting arms 58. Whenever no cassette is attached to the aforedescribed rear wall of the camera, then support runners 53 and 54 lie against support shoulders 14 and 15, whereby the ground front of the ground glass 52 is in the image plane of the camera. The motive to be photographed is depicted by the camera lens on the ground glass, and the selection of the motive and the sharp focusing of the picture is possible in a known manner on the basis of the picture on the ground glass.

For the selective brightness measurement of individual portions of the ground glass picture, blocking device 35–38 is released and the exposure test probe 26 is pulled from its rest position of FIGS. 1 and 3 sufficiently upwardly in housing 25 until its terminal portion lies adjacent recess 41. The probe is then pivoted counterclockwise in FIG. 2 until its end portion 26B abuts against leg 43 of the angle section, as a result of which the angle section pivots 90° into its open position of FIGS. 5 and 8 under the influence of spring 46. Consequently, recesses 42 and 43 are open for the passage of the probe. End portion 26B of the probe then passes through the now opened recesses 41 and 42 as well as through recesses 55 and into the image field and is then located directly in front of ground glass 52, facing the camera lens. By shifting the probe in its longitudinal direction and by pivoting it about the axis of device 32, sighting aperture 28 may be adjusted to almost any arbitrary location within the image field. End part 26B of the probe and the sighting aperture 28 are visible through ground glass 52. Whenever a portion of the picture, the brightness of which is to be measured, is projected onto the ground glass through aperture 28, then the position of the probe is blocked with the assistance of blocking device 35–38 and the opto-electric transducer 29 is brought to the location of the sighting aperture by operation of key 30, so that now the brightness of the selected portion of the picture may be measured opto-electrically.

During this brightness measurement, support runners 53 and 54 of frame 51 remain in a position fitted against support elements 14 and 15, so that ground grass 52 retains the same position unchanged as before during the motive selection and sharp focusing of the ground glass picture. This is possible despite the relatively low ground glass focal distance S and a thickness of probe 26 exceeding this value S, because as seen in FIG. 8 a space having a greater depth $X = S + R$ is available for the introduction of probe 26 into the image field. For a preferred, practical embodiment of the rear wall of the camera: $S = 4.85$ mm, $R = 3.0$ to 3.4 mm, $X = 7.85$ to 8.25 mm. And, rod-shaped exposure test probe 26 has a thickness of about 7.5 mm without there being any danger of contact with the front of the ground glass.

After the brightness of one of the several selected portions of the picture of the ground glass picture has been measured in the desired manner, probe 26 is moved out of the image field 12 and is returned to its rest position of FIGS. 1 and 3. As soon as end portion 26B of the probe is pulled back into recess 41, angle section 43,44 pivots back under the influence of spring 46 into its closing position, so that leg 43 closes recess 41 and leg 44 closes continuation recess 42. Probe 26 is retained in its rest position in housing 25 by means of blocking device 35–38.

For taking a photograph, a cassette (not shown) containing light-sensitive material, the flange focal distance of which agrees with the ground glass focal distance S, is inserted between cassette guide frame 11 and ground glass frame 51, whereby the latter is forced away from frame 11 against the influence of the springs (not shown) associated with arms 58. Whenever the cassette is correctly inserted and rests on support elements 14 to 17 of frame 11, then the light sensitive layer of photographic material lies in practically the same plane in which the ground side of the ground glass 52 lies during the setting of the ground glass picture and during the selective exposure measurement. Subsequently, the exposure of photographic material is carried out in a known and customary manner.

From the foregoing, it can be seen that the rear wall construction of the camera according to the invention produces a number of advantages, significant for the practice. For example, the exposure test probe 26 is readily and easily accessible for making selective exposure measurements before a cassette with light-sensitive material is attached to the rear wall of the camera. Whenever the exposure test probe is not in use, especially during the taking of photographs, it will be positively retained in a rest position out of interference during handling of the camera. The rear wall of the camera may be developed without construction difficulties with the use of commercial, so-called international cassettes according to standard sheet ASA Z38.1.51-1951, and permits an exposure measurement to be taken directly on the front side of ground glass 52, facing the camera lens, without impairing the wide angle efficiency of the camera and without the need to change the ground glass frame for the brightness measurement in its focus-position. Nevertheless, exposure probe 26 may have a thickness which exceeds the ground glass focal distance X. Whenever the exposure test probe is in its rest position in housing 25, then both recess 41 in guide supporting 18 as well as continuation recess 42, which extends thru support shoulder 14, are closed by angle section 43, 44 in a light-tight manner, as a result of which any undesirable incidence of light through recesses 41 and 42 to the light-sensitive material in the cassette attached to the rear wall of the camera, is substantially avoided, even if probe 26 has been pulled completely from holding device 32 arbitrarily or unintentionally and is thus removed from cassette guide frame 11.

Although housing 25, containing holding device 32 for the probe, is shown disposed on cassette guide frame 11, the housing together with the holding device for the probe may alternatively be disposed on ground glass frame 51, without departing from the invention. Also, the housing containing the holding device for the probe may be removably attached to the cassette guide frame or to the ground glass frame. It is also possible to omit housing 25 for the accomodation of the exposure test probe in its rest position and to dispose holding device 32 for the probe in some other manner on the cassette guide frame or on the ground glass frame, removably or otherwise.

For the embodiment shown, and for the alternative embodiments discussed above, it is possible to remove exposure test probe 26 completely from holding device 32 and exchange it for another probe. Also, it is possible according to the invention to utilize the same exposure test probe selectively on one of several rear walls of the camera of the type described, for variable picture sizes.

Since, for the prevention of an undesirable incident of light on the light-sensitive material in the cassette disposed on the rear wall of the camera, leg 44 of the angle section has a greater thickness than leg 43, the latter may be omitted for certain variations of the presently disclosed embodiment. In certain cases it is, however, also possible to omit the entire angle section 43, 44 whenever care has been taken in some other manner so as to avoid the occurrence of disturbing incidence of light. For example, instead of a pivotable angle section 43, 44, some other movable section such as a slide may be provided for the light-tight closure of recesses 41 and/or 42.

Obviously, many other modifications and variations of the present invention are made possible in the light of the above teachings. It is therefore to be understood that within the scope of the appended claims the invention may be practiced otherwise than as specifically described.

What is claimed is:

1. In a photographic cassette camera having a cassette guide frame and an attachable ground-glass frame supporting a ground-glass for observation of a subject to be photographed, one of said frames defining an image field of the camera, a rear wall construction of the camera wherein said cassette guide frame has planar support elements defining a support plane and being surrounded by lateral support surfaces, said ground-glass frame having support runners which fit against said elements for mounting the ground-glass parallel to said support plane at a focal distance therefrom, a bar-shaped exposure measuring probe having at one end an opto-electric transducer and being mounted on a holding device on one of said frames for sliding and pivotal movement adjacent one of said lateral support elements, said one lateral element and one of said support runners lying adjacent thereto having recesses therein permitting movement of said probe between a selectively adjustable measuring position within the field on a front side of the ground-glass and a rest position completely out of the image field, said probe having a dimension perpendicular to said planar support elements which exceeds said focal distance, said probe engaging said recesses whenever it is adjusted for a measuring position.

2. The camera according to claim 1, wherein said one lateral element is defined by a movable guide frame segment for the light proof closure of said support runner recess whenver said probe is not set in a measuring position.

3. The camera according to claim 2, wherein said movable segment is pivotally mounted on said guide frame and is spring biased into a light-proof closing position, said segment being pivoted into an open position by said probe when moved into said measuring position.

4. The camera according to claim 3, wherein said segment is mounted for pivotal movement about an axle lying parallel to said support plane and to said lateral guide surfaces, said axle being displaced from said support plane toward said front side by a distance P, and said segment having an outer side wall which is parallel to said support plane when is said open position, said axle being displaced from said open side wall a distance Q less than sid distance P.

5. The camera according to claim 4, wherein said segment is defined by an angle section having a support surface lying in said support plane and a leg defining said outer side wall which closes said lateral element recess in a light-proof manner in a closing position of said segment, said angle section being pivoted 90° into said open position by said probe abutting against said leg when adjusted into said measuring position thereof.

6. The camera according to claims 1, 2, 3, 4 or 5, wherein said probe is removably mounted on said holding device.

7. The camera according to claims 1, 2, 3, 4 or 5, wherein said holding device is disposed in a scabbard-like housing which receives at least a portion of said probe.

8. The camera according to claim 7, wherein said housing and said holding device are disposed on said guide frame.

9. The camera according to claim 7, wherein said housing and said holding device are removably mounted on one of said frames.

10. The camera according to claims 1, 2, 3, 4 or 5, wherein said holding device is movably mounted on one of said frames.

* * * * *